United States Patent [19]

Hetrick

[11] 4,329,834
[45] * May 18, 1982

[54] SAFE BLADE STRUCTURES FOR MOWING VEGETATION

[76] Inventor: Glenn C. Hetrick, 2045 E. Parkway Dr., Altoona, Pa. 16602

[ * ] Notice: The portion of the term of this patent subsequent to Oct. 23, 1996, has been disclaimed.

[21] Appl. No.: 199,388

[22] Filed: Oct. 21, 1980

[51] Int. Cl.³ .......................................... A01D 55/18
[52] U.S. Cl. ...................................................... 56/295
[58] Field of Search ................... 56/295, 13.4; 30/347, 30/263

[56] References Cited

U.S. PATENT DOCUMENTS

| | | | |
|---|---|---|---|
| 2,547,540 | 3/1951 | Roberts | 56/295 |
| 2,760,327 | 8/1956 | Bovee | 56/13.4 |
| 2,779,146 | 1/1957 | Mitchell et al. | 56/13.4 |
| 2,902,814 | 9/1959 | Lewis et al. | 56/295 |
| 3,049,854 | 8/1962 | Denney | 56/295 |
| 3,091,906 | 6/1963 | Hall | 56/295 |
| 3,097,469 | 7/1963 | Belfiore | 56/295 |
| 3,103,093 | 9/1963 | House, Jr. | 56/295 |
| 3,191,371 | 6/1965 | Brewer | 56/295 |
| 3,283,488 | 11/1966 | Franklin | 56/295 |
| 3,327,460 | 6/1967 | Blackstone | 56/295 |
| 3,399,519 | 9/1968 | Buchanan | 56/295 |
| 3,420,043 | 1/1969 | Hershey | 56/295 |
| 3,540,108 | 11/1970 | Heth et al. | 56/295 |
| 3,605,841 | 9/1971 | Lindstrom et al. | 30/263 |
| 3,621,642 | 11/1971 | Leake, Jr. | 56/295 |
| 3,715,824 | 2/1973 | Goserud | 56/295 |
| 3,805,502 | 4/1974 | Herter | 56/295 |
| 4,161,096 | 9/1979 | Biberger | 56/295 |
| 4,171,608 | 10/1979 | Hetrick | 56/295 |

FOREIGN PATENT DOCUMENTS

| | | | |
|---|---|---|---|
| 2327356 | 1/1975 | Fed. Rep. of Germany | 56/295 |
| 2614649 | 10/1976 | Fed. Rep. of Germany | 56/295 |
| 2306621 | 11/1976 | France | 56/295 |

*Primary Examiner*—Paul J. Hirsch
*Attorney, Agent, or Firm*—Kenneth E. Darnell

[57] ABSTRACT

Blade structures useful particularly for mowing vegetation, the several embodiments of the present invention are useful with rotary lawn mowers and weed trimmers intended for mowing lawns and other vegetation with a maximum degree of cutting effectiveness and user safety. The present structures are preferably mounted to the drive shaft of a mower or trimmer in the place of a conventionally used cutting structure, usually without the need for modification of the mower or trimmer. Generally, the present structures include a plate member which acts to bend at least upper portions of vegetation downwardly to allow a cutting bar carried by the plate member to strike the vegetation at or below the bent portions to facilitate clean and rapid cutting of the vegetation. The plate member serves in most embodiments of the invention to prevent the cutting bar from striking other than a glancing blow to the extremities of a user which might actually come into contact with a cutting structure of a mower or trimmer, thereby imparting a safety margin to the use of the present structures which is not characteristic of conventional rigid and semi-rigid lawn mower blades.

33 Claims, 22 Drawing Figures

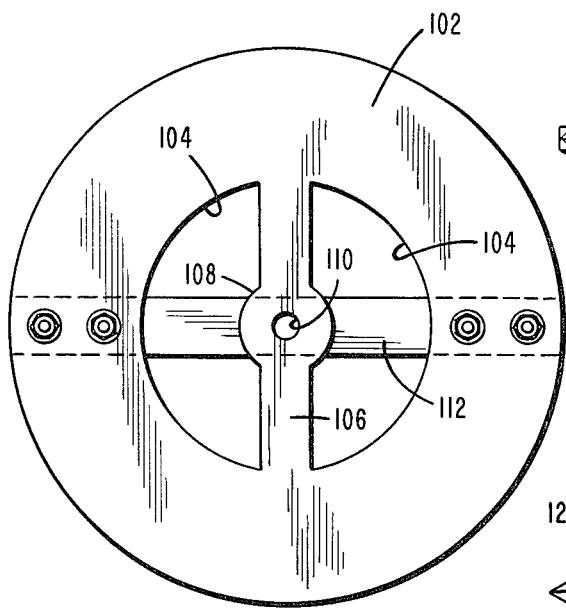
FIG.12b
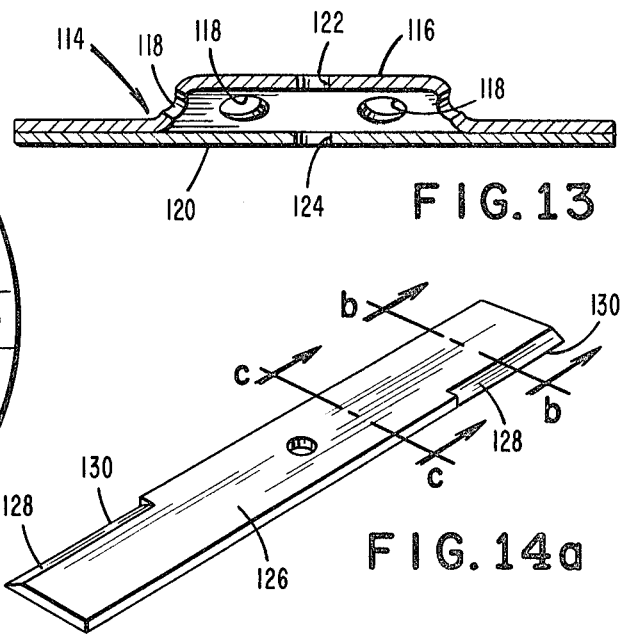
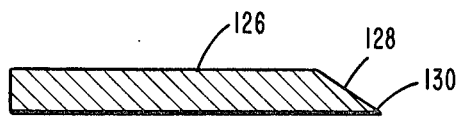
FIG.13
FIG.14a
FIG.14b
FIG.14c
FIG.15a
FIG.15b
FIG.15c
FIG.15d
FIG.15e

SAFE BLADE STRUCTURES FOR MOWING VEGETATION

BACKGROUND AND SUMMARY OF THE INVENTION

The invention relates generally to cutting structures for rotary lawn mowers and so-called weed trimmers and particularly concerns such cutting structures having improved cutting effectiveness and safety characteristics.

While rotary mowing and trimming devices have come into general use both for the consumer and for industry, conventional rigid and semi-rigid cutting blades remain dangerous in use and account for thousands of injuries each year. Even though conventional rigid cutting blades are generally effective for cutting normal vegetation on a lawn, these safety deficiencies have resulted in the development of non-rigid cutting structures which are generally less capable of causing serious injury to a user. However, these non-rigid cutting structures, when sufficiently light in weight to prevent substantial injury, are deficient in their ability to cut normal vegetation encountered even on the typical lawn. All prior cutting structures used primarily for the usual "lawn" mowing are unable to effectively cut heavy vegetation and can not effectively be used unless normal vegetation is relatively dry.

In answer to the deficiencies occasioned by prior art cutting structures, the present invention provides cutting structures useful for mowing vegetation both effectively and safely when compared to prior cutting structures utilized for similar purposes. Further, the present invention provides capabilities to the user of a conventional lawn mower or trimmer which were not previously available. In the context of increased safety, the user of a conventional lawn mower modified according to the present invention allows the clearing and cutting of relatively heavy vegetation in an overgrown field or similar situation without the need for specialized equipment. The same conventional mower modified according to the present invention is also capable of producing a high quality cut on a "normal" lawn. The invention further provides the capability to a user of cutting grass immediately after a rain even though the grass or other vegetation is too wet to be conventionally cut. When adapted to a conventional trimmer, the present invention allows rapid and high quality cutting of vegetation with a degree of efficiency which allows for the first time the cutting of large areas of vegetation with a trimmer and within a reasonably short period of time. The present structures are also capable of bagging mowed vegetation when used with vegetation cutting devices equipped to catch and collect mowed vegetation during the mowing process.

The present structures are particularly useful in that conventional mowing equipment modified according to the invention exhibits increased safety during operation. In particular, in most embodiments of the invention a plate member is employed which effectively shields the cutting surfaces of the structures from other than indirect contact with the hands or feet of a user. Due to the particular structure of the several embodiments of the invention, contact between the cutting surfaces and the user is normally limited to a glancing blow which would not penetrate the skin or cause fracture. The present structures also typically minimize the risk from thrown objects which occur when a conventional lawn mower blade strikes an object such as a rock. Rather than striking such an object a direct blow and causing the object to be thrown with great velocity from the mowing machine, the present structures typically strike the object a glancing blow and "dribbles" the object along the ground from under the mowing machine. The present structures are seen to have inherent safety features which provide substantially reduced risk of injury to a user, these safety features being potentially enhanced by the inclusion of other structure which may be employed on conventional mowing devices for the improvement of safety.

The structures according to the present invention typically comprise a plate member which surmounts a cutting bar which is normally carried by or associated with the plate member. The plate member is typically circular in conformation but can be provided as other geometrical shapes, particularly with rounding off of the corners of such shapes. The cutting bar surmounted by the plate member can also take a variety of forms and can even be integrally formed with the plate member from a material such as metal or plastic. In most embodiments of the invention, the cutter bar is surmounted by the plate member and does not extend beyond the periphery of said plate member. The structures of the present invention are typically mounted to the drive shaft of a conventional mower or trimmer with the cutter bar facing vegetation which is to be cut, the cutter bar typically being shielded from the user by means of the plate member which also acts to deform the vegetation into a favorable position for cutting by the cutter bar.

Accordingly, it is a primary object of the present invention to provide cutting structures useful with mower and trimmer machines, which cutting structures exhibit improved safety capabilities and improved ability to mow and trim vegetation.

Further objects and advantages of the present invention will become more readily apparent in light of the following detailed description of the preferred embodiments.

BRIEF DESCRIPTION OF THE DRAWINGS

FIGS. 12a and 12b are perspective and plan views, respectively of non-continuous circular plate members having cutter bars formed thereon;

FIG. 13 is a side elevational view in section of an embodiment having a contoured plate member;

FIGS. 14a, 14b and 14c are views of a particular cutter bar useful according to the invention;

FIGS. 15a, 15b, 15c and 15d are sectional views of cutter bars useful according to the invention; and FIG. 15e is a perspective view of a cutter bar useful according to the invention.

DESCRIPTION OF THE PREFERRED EMBODIMENTS

Figure 1:
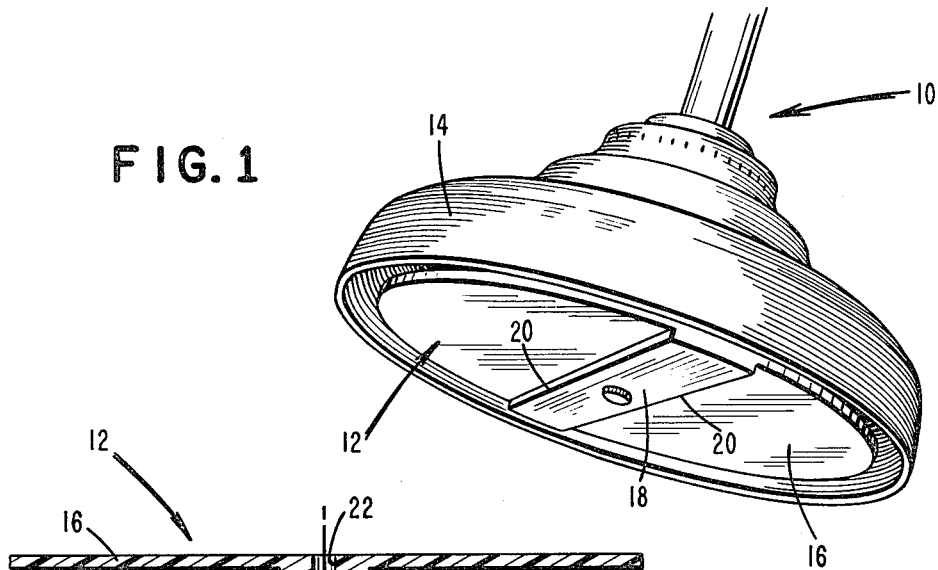
FIG. 1 is a perspective view of a conventional trimmer modified by replacement of the conventional rigid or non-rigid cutting structure with a unitary plate and cutter bar structure according to the present invention.

U.S. Pat. No. 4,171,608, issued to the present inventor is incorporated hereinto by reference, the structures according to the present invention providing modifications to concepts described in said patent.

As described in U.S. Pat. No. 4,171,608 and as described also herein, a family of relatively safe cutting structures are disclosed which are particularly useful for cutting and trimming vegetation with conventional lawn mower, industrial mower, and trimmer apparatus. The structures so disclosed are particularly formed of a plate member which surmounts one or more cutter bars. The plate members and cutter bars can take a variety of configurations which can be interchangeable between the varying plate member configurations and cutter bar configurations without departing from the scope and intent of the invention. Generally, the plate member carries the cutter bar and acts to facilitate cutting of the vegetation and typically prevents the cutter bar from contacting the hands or feet of the user or any object under the mowing apparatus with other than glancing contact. The present structures are thus capable of producing a high quality of cut with maximum safety to a user. The present structures further have the capability of cutting extremely dense and heavy vegetation, such as is necessary in clearing a previously vacant or fallow lot or field and is even capable of mowing vegetation immediately after a rainfall when such vegetation would be too wet to be cut by means of conventional mowing or trimming apparatus. The plate members and cutter bars of the present invention can be formed integrally in one piece in order to reduce manufacturing costs or can be formed such as is described in U.S. Pat. No. 4,171,608 with the cutter bar removable in order that cutting edges can be renewed by reorienting the cutter bar relative to the plate member to expose new cutting edges.

Considering now the various configurations of plate members which can be used according to the invention, it is to be noted that a circular disc conformation such as is particularly described in U.S. Pat. No. 4,171,608 is usually preferred due to the relative safety of such a plate member. In essence, the circular conformation of such a disc provides a continuous arcuate edge which acts to shield the extremity of a user from contact with cutting surfaces of the present cutting structures. The continuous arcuate surfaces of a circular disc gently "push" an extremity such as the foot of a user away from the rotating plate member and cutter bar without providing cutting edges which would injure such an extremity accidentally brought into contact therewith. Other geometrical shapes can also be employed for the plate member, including square, triangular and other polygonal shapes. Preferably, the corners of such geometrical configurations are rounded where the sides of said geometrical configurations meet in order to eliminate a relatively sharp "edge" normally encountered at such corners.

Cutter bars useful according to the invention typically take the form of elongated bar-like rods which take the form of rectangular solids which may be rectangular, trapezoidal or parallelogramic in cross section with or without bevelled cutting edges. The cutter bars are typically formed integrally with the plate members or may be mounted thereto, usually with upper surfaces of the cutter bars being disposed against undersurfaces of the plate members, although certain embodiments of the invention are configured otherwise. The ends of the cutter bars typically do not extend beyond the periphery of the surmounting plate members according to most embodiments of the invention. Given such general characteristics as foreground, the several embodiments of the present invention comprehended by the claims defining the scope of the invention are exclusively described hereinafter.

Referring now to FIG. 1, a conventional trimmer apparatus is seen generally at 10 to be fitted with a cutting structure 12 which replaces either a conventional rigid blade or conventional non-rigid cutting surface structure such as are typically used with such trimmer apparatus. The cutting structure 12 can take the form of any of the structures described according to the invention in U.S. Pat. No. 4,171,608 or herein, the cutting structure 12 of FIG. 1 being expressly shown as a unitary structure formed of a plastic such as ZYTEL ST801 or Z-801, such as is manufactured by the DuPont de Nemours Corporation of Wilmington, De. The cutting structure 12 can be formed of metal, cast or machined, or from cast or otherwise formed wear-resistant material such as the plastic material mentioned. While the cutting structure 12 is seen to be utilized with the trimmer apparatus 10, it is to be understood that the cutting structure 12 could be utilized on a conventional lawn mower such as used for home or heavy commercial use, the primary variation being merely in the size of the cutting structure 12 which would be required for mowing and trimming apparatus of differing sizes and uses. When used with a trimmer apparatus such as the apparatus 10, the cutting structure 12 is preferably provided with a shield 14 which is mounted to the apparatus 10 and does not rotate with the cutting structure 12. As is conventional in the art, the shield 14 may take the form of a partial shield rather than the full shield as illustrated. The trimmer apparatus 10 fitted with one of the present cutting structures is capable of trimming the vegetation normally encountered in the lawn of a home owner as well as the relatively heavier vegetation encountered when clearing vacant lots or fields and field-like areas where vegetation has been allowed to grow over a period of time. The cutting structure 12, as well as the other cutting structures employed according to the invention, enables a user of the trimmer apparatus 10 as well as other mowing apparatus with which the invention is useful to be employed for "production" mowing of such areas with a minimum of difficulty and with a maximum of safety. Conventional trimmer apparatus, particularly the "filament" trimmers are incapable of cutting heavy vegetation with the filament sizes typically available to the home owner and, in any event, are incapable of true production cutting of large areas. Further, the present cutting structures such as the cutting structure 12 are capable of use around fences, such as chain-link fences, and around cement curbing and in similar situations where filament trimmers particularly are not useful due to the inability of the filament to withstand the heavy wear which is occasioned by contact with fences, cement borders and the like. The cutting structure 12 is also substantially more useful than rigid blades employed in a trimmer apparatus such as the apparatus 10 since the present structures do not provide a "naked" blade which can strike fence posts and cement curbing and thus be worn or broken. Cutting edges of the present cutting structure 12 as well as the other structures according to the present invention are impeded from striking direct and solid blows upon such obstructions due to the shielding afforded to the cutting surfaces by means of surmounting plate members as described above and as will be described explicitly hereinafter.

Figure 2:
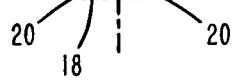
FIG. 2 is a side elevational view in section of a unitary cutting structure such as is utilized in the trimmer device of FIG. 1.

Referring now to FIG. 2, the cutting structure 12 of FIG. 1 is seen in greater detail to be formed substantially of a single body of material as heretofore described. The cutting structure 12 is particularly seen to comprise a plate member 16 formed as a substantially circular disc with a cutting bar 18 of substantially rectangular cross section being formed integrally with the plate member 16 and being disposed over an undersurface of said plate member 16 diametrically across said member 16. Longitudinally extending edges 20 on opposite sides of the cutter bar 18 provide the cutting edges which contact vegetation and cause cutting thereof. As is described in U.S. Pat. No. 4,171,608, the cutter bar 18 essentially has a length which is equal to the diameter of the circular plate member 16, the ends of the bar 18 terminating along peripheral edges of the plate member 16 and not extending beyond the periphery of the plate member. A central aperture 22 extends through the cutting structure 12 to allow mounting of a drive shaft (not shown) of the trimmer apparatus 10 therethrough, conventional connecting structures mounting the integral plate member 16 and cutter bar 18 to the drive shaft of the apparatus 10.

Figure 3:
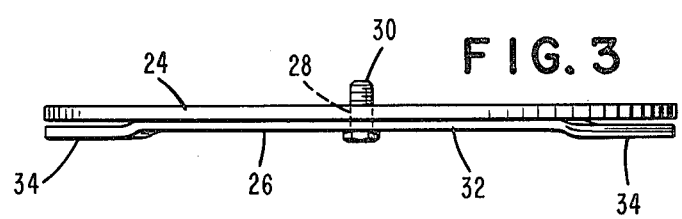
FIG. 3 is a side elevational view of a plate member having a cutter bar mounted thereto and wherein the ends of the cutting bar are fluted out of plane.

FIG. 3 illustrates a second embodiment of the invention which is comprised of a plate member 24 shown in FIG. 3 as a circular disc and a cutter bar 26 which has a configuration similar to that of a conventional rigid blade such as is presently used on lawn mowing apparatus. The plate member 24 is a continuous planar disc having an aperture 28 formed essentially therethrough to receive drive shaft 30 of conventional mowing or trimmer apparatus. The cutter bar 26 is formed with flat, planar medial portions 32 which mount flushly against the underside of the plate member 24. The ends 34 of the cutter bar 26 are convoluted and extend out of the plane of the medial portions 32 of the cutter bar 26 and are spaced from the underside of the plate member 24. In the embodiment expressly shown, the ends 34 of the cutter bar 26 do not extend beyond the periphery of the plate member 24 although such a configuration could be formed. It is to be noted that the cutting structure formed by extension of the ends 34 of the cutter bar 26 beyond the periphery of plate member 24 would be inherently less safe than the embodiment illustrated in FIG. 3 due to the ability of the ends of such a cutter bar to directly contact a user without the shielding afforded by the plate member 24. In essence, the cutter bar 26 illustrated in FIG. 3 comprises a conventional cutting blade of a type well known in the art, the ends of such a blade being bent out of the plane of the body of the blade and essentially fluted, cutting edges of such a blade being particularly formed on edges of the ends of said conventional blade. The cutter bar 26 is seen to be mounted to the plate member 24 on the drive shaft 30 by conventional connecting structure.

Figure 4:
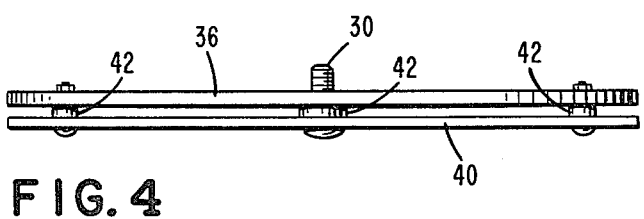
FIG. 4 is a side elevational view of a cutting structure according to the invention and comprising a plate member and cutting bar spaced from the plate member.

FIG. 4 illustrates a further embodiment of the invention wherein a plate member 36 mounted on a drive shaft 30 has a cutter bar 40 spaced slightly from the underside thereof and mounted thereto by means of conventional fastening elements. Spacer elements 42 associated with the fastening elements mount the cutter bar 40 to the plate member 36 for movement therewith. In the embodiment shown in FIG. 4, the plate member 36 is illustrated as being a circular disc while the cutter bar 40 optionally takes the form of a rectangular solid such as is illustrated in U.S. Pat. No. 4,171,608 and as is also illustrated herein.

Figure 5:
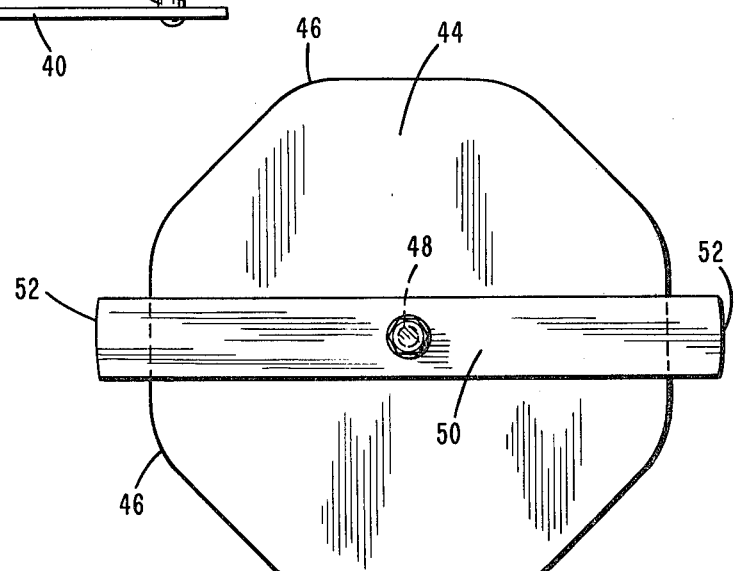
FIG. 5 is a view of undersurfaces of a further embodiment of the present invention wherein the plate member takes the form of an octagon with rounded corners and end portions of the cutter bar extend beyond the periphery of the plate member.

FIG. 5 presents a further embodiment of the invention including a plate member 44 formed essentially as an octagon having rounded corners 46, the octagonal plate member 44 having a central aperture 48 formed therein to receive a drive shaft (not shown). In the embodiment illustrated, a cutter bar 50 of rectangular cross section is seen to be mounted to the underside of the octagonal plate member 44 with ends 52 of the cutter bar 50 extending beyond the periphery of the plate member 44. It should again be pointed out that the configuration of the plate member 44 and the configuration of the cutter bar 50 could take the form of any of such structures contemplated according to the invention to provide an embodiment having the structural and operational features of the particular embodiment of FIG. 5. The embodiment of FIG. 5 can be used in a situation where the spacing of the periphery of the plate member 44 is to be increased relative to undersurfaces of a lawn mower deck (not shown) or the like in order to facilitate bagging of mowed material while maintaining a certain width of cut by allowing the cutter bar 50 to extend beyond the periphery of the plate member 44 as by the ends 52. As discussed above, extension of the ends 52 of the cutter bar 50 beyond the periphery of the plate member 44 results in a cutting structure which is less safe than the disclosed cutting structures wherein the ends of the respective cutter bars do not extend beyond the periphery of the associated plate members.

Figure 6:
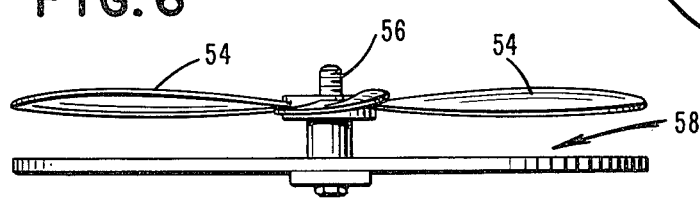
FIG. 6 is a side elevational view of a cutting structure according to the invention and including an impeller carried by a mounting shaft for creation of an air updraft to facilitate bagging of mowed vegetation.
Figure 7:
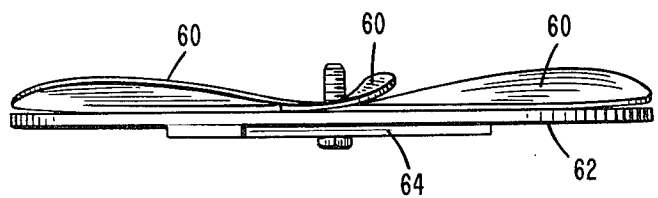
FIG. 7 is a side elevational view of a cutting structure according to the present invention wherein an impeller is carried directly by the plate member.

FIG. 6 illustrates an embodiment of the invention wherein an impeller 54 is carried by a drive shaft 56 and is mounted thereto above a plate member/cutter bar structure 58. In the apparatus thus shown, the impeller 54 is pitched to create an updraft in order to direct air and mowed vegetation along a path which takes the mowed vegetation to a collection structure (not shown). Various structures capable of creating such air movement are known in the art, certain forms of such structure being also described in U.S. Pat. No. 4,171,608. FIG. 7 illustrates similar disclosure wherein impeller elements 60 are carried directly by plate member 62 which mounts cutter bar 64 on the opposite surface thereof. The impeller elements 60 are pitched to create an updraft on rotation of the plate member 62 to facilitate bagging as described above relative to the structure of FIG. 6.

Figure 8:
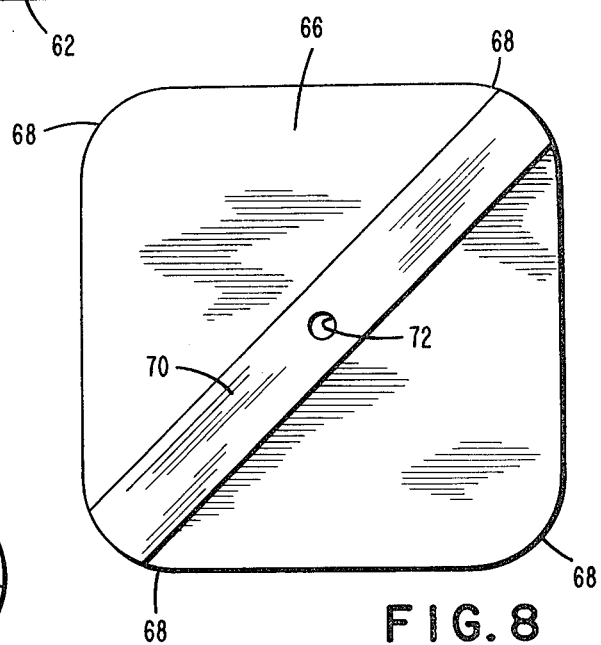
FIG. 8 is a view of undersurfaces of a square plate member having rounded corners wherein the cutter bar extends diagonally across the plate member.

In FIG. 8, a plate member 66 is seen to take the form of a square plate element having rounded corners 68. A cutter bar 70 is seen to extend diagonally across the plate member 66 and to terminate along diagonally opposite rounded corners 68. The cutter bar 70 is mounted to the plate member 66 by fastening elements as described relative to other embodiments, the cutter bar typically having an aperture 72 which is aligned with an aperture (not shown) in the plate member 66 through which a drive shaft (not shown) is received and secured. The plate member 66 can be formed with 90° or "sharp" corners, but is safer in usage with the rounded corners 68.

Figure 9:
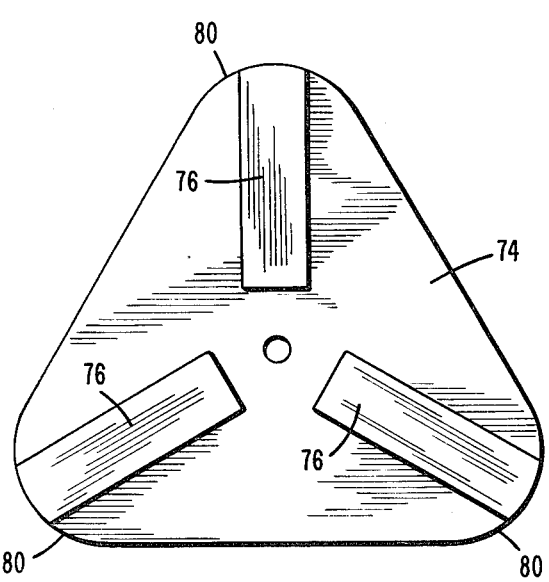
FIG. 9 is a view of undersurfaces of a triangular plate member wherein cutting edges are provided by discontinuous cutter bars mounted to one surface of the triangular plate member.

FIG. 9 illustrates a triangular plate member 74 having a plurality of cutter bars 76 mounted on an undersurface thereof. The cutter bars 76 are mounted at regular intervals about the plate member 74 and have their longitudinal axes extending radially from an aperture 78 formed in said plate member 74 for mounting to a drive shaft (not shown). The triangular plate member 74 is seen to be provided with rounded corners 80. It should be understood that a plate member of any configuration such as is envisioned according to the invention could be used with discontinuous cutter bars such as the cutter bars 76, it not being necessary for such cutter bars to extend either diametrically across a plate member or fully and continuously across a diameter or other portion of a plate member. According to the invention, it is necessary only that a balanced structure be provided. It is within the scope of the invention to provide a plurality of cutter bars which can extend fully across the plate member but which do not necessarily so extend in order that a plurality of cutting edges can be provided to the total structure. Such cutter bars can be formed integrally with the plate member or can be mounted thereto for replacement or reorientation as described herein and as described in U.S. Pat. No. 4,171,608. Further, as will also be described hereinafter, the ends of cutter bars such as the cutter bars 76 need not extend fully to and be flush with the periphery of a plate member such as the plate member 74.

Figure 10:
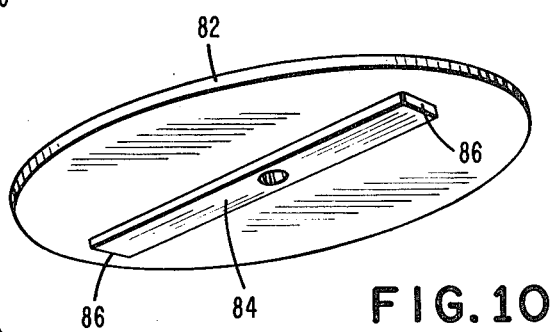
FIG. 10 is a perspective view of a further embodiment of the present invention and comprises a circular plate member having a cutter bar which does not extend the full diameter of the plate member.

In FIG. 10, a plate member 82 is shown to have a cutter bar 84 flushly mounted against the undersurface thereof, the ends 86 of the cutter bar 84 being spaced from the periphery of the plate member 82. The plate member 82 and cutter bar 84 are mounted for rotary movement with a driven shaft (not shown) of a mowing or trimming apparatus.

Figure 11:
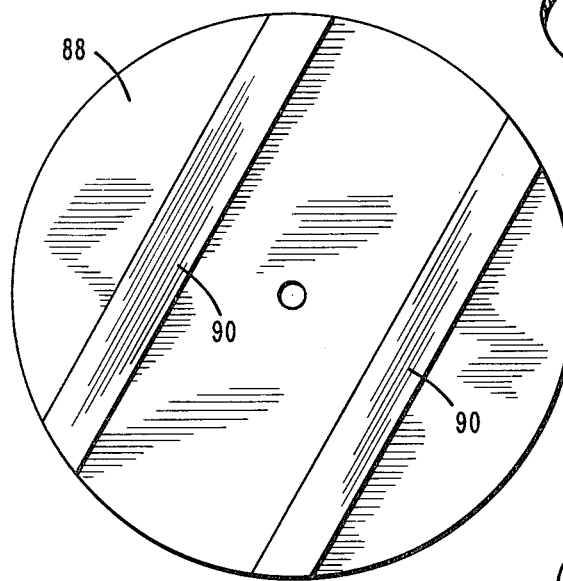
FIG. 11 is a view of undersurfaces of an embodiment of the invention wherein cutter bars are disposed along chords of a circular plate member.

FIG. 11 illustrates yet another embodiment of the present invention which comprises a plate member 88 having two cutter bars 90 which are disposed along chords of the circular disc forming said plate member 88. In this embodiment, the cutter bars 90 do not extend beyond the periphery of the plate member 88.

Figure 12A:
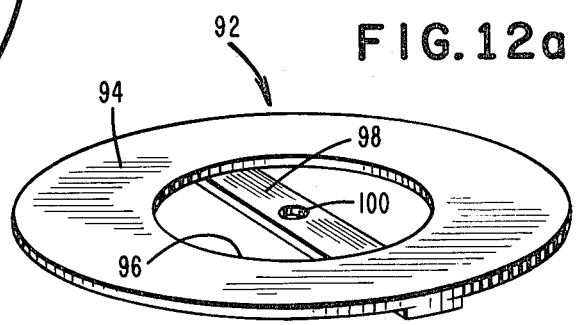

FIGS. 12a and 12b illustrate plate members according to the invention wherein the plate members are planar but are not continuous over full portions thereof. In FIG. 12a, plate member 92 of substantially circular configuration is seen to be annular in conformation with annular ring portion 94 bounding an enlarged central aperture 96. A cutter bar 98 mounted to one side of the plate member 92 has an aperture 100 formed therein for receiving a drive shaft (not shown). The cutter bar 98 can be formed integrally with the disc-like plate member 92 or can be otherwise attached to said plate member 92. In FIG. 12b, a plate member 102 is seen to be planar and to have portions 104 removed from central areas thereof to cause the plate member 102 to be substantially annular in conformation. A medial mounting bar 106 having an enlarged hub portion 108 allows direct mounting of the plate member 102 to a drive shaft (not shown), the hub portion 108 having an aperture 110 formed therein to receive the drive shaft. A cutter bar 112 is mounted to or formed with the plate member 102 and is also formed with an aperture (not shown) which aligns with the aperture 110 to receive the drive shaft. The central, cut-away portions of the plate members 92 and 102 can act to facilitate movement of mowed vegetation up through the center of the plate members, thereby to facilitate bagging of mowed vegetation by allowing space through which air and entrained vegetation can flow.

FIG. 13 illustrates a plate member 114 which is contoured to have central portions which extend out of the plane of peripheral portions of the plate member 114. The out-of-plane portions of the plate member 114 form a central dome 116 which can be provided with apertures 118 in side walls thereof, the apertures 118 acting to allow air flow therethrough to facilitate bagging of mowed vegetation. A cutter bar 120 extends across the plate member 114 and is mounted as aforesaid at least to peripheral portions of the plate member 114. A drive shaft (not shown) is mounted through a central receiving aperture 122 and an aperture 124 in the cutter bar 120. The drive shaft could, of course, be mounted only through the aperture 122 in the plate member 114.

A cutter bar which can be used according to the present invention and as seen in U.S. Pat. No. 4,171,608 is seen at 126 to have a bevel at 128 along one half of the cutter bar 126 on one side thereof and along an oppositely disposed one half of the cutter bar 126 on the other side thereof. The bevel 128 causes the formation on respective ends of the cutter bar 126 of cutting edges 130. When the cutter bar 126 is mounted flushly against a plate member according to certain embodiments of the invention, upper planar surfaces 132 of the cutter bar 126 mount flushly against undersurfaces of a plate member. As is noted in U.S. Pat. No. 4,171,608, a groove can be formed in the plate member itself in order to receive cutter bars such as the cutter bar 126. In FIG. 14a, the cutter bar 126 is shown in perspective, FIGS. 14b and 14c showing sections of the cutter bar 126 respectively through an end thereof and near the center thereof in order to show the varying cross-sectional conformations of the cutter bar 126 along its length.

FIGS. 15a–15e illustrate varying configurations of cutter bars which are useful according to the invention. In particular, FIG. 15a illustrates a cutter bar 134 having a rectangular cross section along its length. FIG. 15b illustrates a cutter bar 136 having a cross section which is formed in the shape of a parallelogram with one longitudinal edge 138 forming the vertex of an acute dihedral angle at 140. The longitudinal cutting edge 142 on the other side of the cutter bar 136 forms the vertex of an obtuse dihedral angle 144. The cutter bar 146 of FIG. 15e modifies the structure of the cutter bar 136 so that both cutting edges 148 are vertices of acute dihedral angles. In FIG. 15c, cutter bar 150 has a trapezoidal cross section with cutting edges 152 subtending acute dihedral angles. In FIG. 15d, a cutter bar 154 is formed with bevelled edges at 156, the cutting edges 158 thus formed presenting less of a sharpened edge and being therefore less capable of cutting the skin of a user.

It should be understood that certain configurations of the present cutting structures are relatively more or less safe than certain other configurations since certain of the present cutting arrangements provide greater shielding to the cutting edges and certain cutting edges provide greater ability to cut vegetation due to varying characteristics of the respective cutting edges. Certain other configurations have greater ability to create the air flow necessary to facilitate bagging with the use of a rotary lawn mower or similar piece of mowing equipment. In essence, these structures explicitly described and identified herein are considered to be representative of varying modes and forms which can be taken by cutting structures configured according to the teachings of the present invention. Accordingly, the invention is understood to be defined not by the explicit embodiments of the invention presented herein, but by the structural recitations of the appended claims.

What is claimed is:

1. In an apparatus for mowing vegetation, the apparatus including a drive shaft for imparting rotary movement to a cutting structure mounted therewith, the cutting structure comprising:
   a disc-like plate member mounted relative to the drive shaft for rotation therewith; and,
   at least one cutter bar portion formed as one piece integrally with the plate member, the cutter bar portion extending diametrically across the plate member without the ends of the cutter bar portion extending beyond the peripheral edge of the plate member.

2. In an apparatus for mowing vegetation, the apparatus including a drive shaft for imparting rotary movement to a cutting structure mounted therewith, the cutting structure comprising:
   a plate member mounted relative to the drive shaft for rotation therewith; and,
   at least one cutter bar mounted relative to the drive shaft for rotation therewith, medial portions of the cutter bar being mounted flushly against the plate member and end portions of the cutter bar being spaced from surmounting portions of the plate member.

3. In the apparatus of claim 2 wherein the ends of the cutter bar do not extend beyond the periphery of the plate member.

4. In the apparatus of claim 2, wherein the periphery of the plate member presents a smooth, substantially circular and continuous edge.

5. In an apparatus for mowing vegetation, the apparatus including a drive shaft for imparting rotary movement to a cutting structure mounted therewith, the cutting structure comprising:
   a plate member mounted relative to the drive shaft for rotation therewith; and,
   at least one cutter bar carried by the plate member for rotation therewith, at least medial portions of the cutter bar being flushly mounted against a face of the plate member facing vegetation which is to be mowed, the ends of the cutter bar lying within the extent of the peripheral edge of the plate member while in position to cut vegetation.

6. In the apparatus of claim 5 wherein the plate member and cutter bar are integrally formed.

7. In the apparatus of claim 5 wherein the plate member is circular and at least two cutter bars extend respectively along chords thereof.

8. In the apparatus of claim 5 wherein a plurality of cutter bars extend radially from a central portion of the plate member.

9. In the apparatus of claim 8 wherein the cutter bars are of a length less than the greatest dimension of that surface of the plate member along which the cutter bars lie.

10. In an apparatus for mowing vegetation, the apparatus including a drive shaft for imparting rotary movement to a cutting structure mounted therewith, the cutting structure comprising:
    a plate member mounted relative to the drive shaft for rotation therewith; and,
    at least one cutter bar mounted to the drive shaft for rotation therewith, at least medial portions of the cutter bar being flushly mounted against a face of the plate member facing vegetation which is to be mowed, the ends of the cutter bar lying within the extent of the peripheral edge of the plate member and being thereby positioned to cut vegetation.

11. In the apparatus of claim 10 wherein certain portions of the cutter bar are mounted against the plate member and other portions of the cutter bar are spaced therefrom.

12. In the apparatus of claim 11 wherein the end portions of the cutter bar arespaced from the plate member.

13. In the apparatus of claim 10 wherein upper surfaces of the cutter bar are mounted flushly against the undersurface of the plate member.

14. In the apparatus of claim 13 wherein ends of the cutter bar do not extend to the periphery of the plate member.

15. In the apparatus of claim 10 wherein the ends of the cutter bar do not extend to the periphery of the plate member.

16. In the apparatus of claim 10 and further comprising means carried by the drive shaft for producing a flow of entrained air and mowed vegetation to facilitate collection of said mowed vegetation.

17. In the apparatus of claim 10 and further comprising means carried by the plate member for producing a flow of entrained air and mowed vegetation to facilitate collection of said mowed vegetation.

18. In the apparatus of claim 10 wherein the plate member is circular.

19. In the apparatus of claim 10 wherein the plate member is formed of a regular polygon.

20. In the apparatus of claim 15 wherein the corners of the polygon are rounded.

21. In the apparatus of claim 10 wherein the plate member is square.

22. In the apparatus of claim 10 wherein the plate member is triangular.

23. In the apparatus of claim 10 wherein the cutter bar extends across the plate member and is disposed along the greatest dimension thereof.

24. In the apparatus of claim 23 wherein the cutter bar extends fully across the greatest dimension of the plate member.

25. In the apparatus of claim 10 wherein the plate member is discontinuous at central portions thereof.

26. In the apparatus of claim 10 wherein portions of the plate member are formed out-of-plane with other portions of the plate member.

27. In the apparatus of claim 10 wherein the cutter bar has a rectangular cross section.

28. In the apparatus of claim 10 wherein the cutter bar has a trapezoidal cross section.

29. In the apparatus of claim 10 wherein the cutter bar has at least one cutting edge which forms the vertex of an acute dihedral angle.

30. In the apparatus of claim 10 wherein the cutter bar has a parallelogramic cross section.

31. In the apparatus of claim 10 wherein the cutter bar has bevelled cutting edges.

32. In the apparatus of claim 10, wherein the ends of the cutter bar are spaced from surmounting portions of the plate member.

33. In the apparatus of claim 10, wherein the plate member is circular and the cutter bar is mounted diametrically across the plate member.

* * * * *